Figure 1:
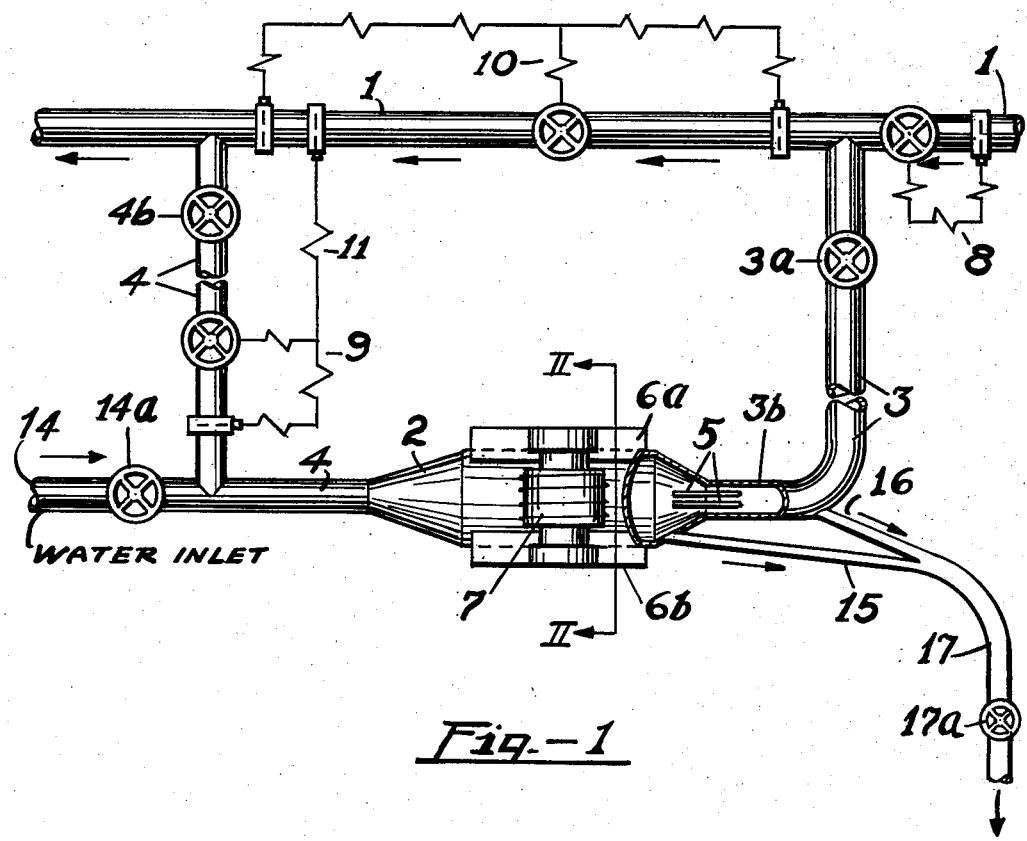

Aug. 19, 1952   H. S. ANDERS   2,607,492
APPARATUS FOR REMOVING IRON IMPURITIES FROM FLUID STREAMS
Filed Jan. 27, 1949

Harley S. Anders Inventor
By W. O. Hillman Attorney

Patented Aug. 19, 1952

2,607,492

UNITED STATES PATENT OFFICE 2,607,492

APPARATUS FOR REMOVING IRON IMPURITIES FROM FLUID STREAMS

Harley S. Anders, Elizabeth, N. J., assignor to Standard Oil Development Company, a corporation of Delaware Application January 27, 1949, Serial No. 73,105

2 Claims. (Cl. 210—1.5)

1

The present invention relates to methods and apparatus for removing small quantities of iron impurities from fluid streams containing the same. More particularly, the invention relates to a method and apparatus for removing small amounts of iron impurities present in the form of iron sulphides from treating solutions such as a solution in water of diethanolamine or of tripotassium phosphate, where used for the treatment of fluid hydrocarbon materials as for the removal of hydrogen sulphide therefrom. The invention may also be applied to the removal of such impurities from the hydrocarbon material under treatment or to any other material in a flowing stream.

Aqueous solutions of diethanolamine and tripotassium phosphate are conventionally used in the treatment of hydrocarbon materials including liquefied hydrocarbons, to remove hydrogen sulphide. In such treatment, a material, such as one consisting largely of liquefied propane gas, may be passed through a liquid contacting tower in countercurrent relation with an aqueous treating solution of the character set forth, and the solution containing hydrogen sulphide removed for regeneration and re-use. The treating solution removed from the treating tower may be regenerated by heating as to about 2120° F. to drive off hydrogen sulphide, and, after cooling to about from 90° to 110° F., the treating solution may be returned to the contacting tower. The contacting tower is usually a packed tower or one provided with a vertical series of perforated plates, providing a plurality of small or interstitial passageways by means of which the liquids are brought into intimate contact.

It has been found that in the operation of such equipment, small amounts of iron impurities, such as iron sulphides, in the treating solution, or hydrocarbon material, tend to cause plugging of the passageways through the tower, interfering with operation of the process. The deposition of these iron impurities also occurs in other parts of the system including heat exchangers, and the regeneration apparatus. In addition, the presence of such impurities is indicated to have a stabilizing effect on emulsions which may be formed between the treating solutions and the materials being treated, or between such materials and other impurities, such as organic acids present in the materials being treated. Such deposits of solid impurities, or the stabilization effect thereof on emulsions formed, results in excessive loss of the treating solution, and in generally inefficient treatment characteristics for

2 the process. These undesirable characteristics may obtain in the presence of as little as from 5 to 30 milligrams of iron sulphide per 100 milliliters of treating solution.

The iron impurities to be removed may be present in the initial feed materials, but, in any event, are considered to be derived to a considerable extent from the contact of the process materials with various piping and other equipment in the treating and handling systems. The concentration and contaminating effect of such materials appears to be accumulative in any handling system. The particle size of these impurities, which may range from about 2 to about 50 microns, makes it extremely difficult to remove them by conventional means such as settling. An object of the invention, therefore, is to remove such impurities by a continuous method, other than settling, and to provide apparatus for such purpose. A further object of the invention is to provide a method and means for removing iron impurities from a flowing stream of fluid containing such impurities by passing the stream through a magnetic field, retaining the iron impurities within the field.

Figure 2:
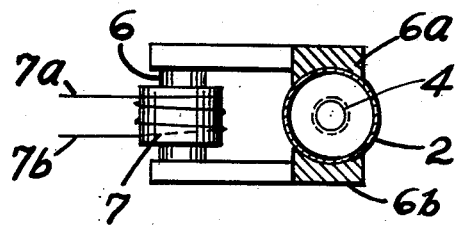

The invention and its objects may be more fully understood from the following description when read in conjunction with the accompanying drawings in which Figure 1 is a piping diagram in which the separating apparatus is shown partly in vertical section, and Figure 2 is a cross-sectional view of the apparatus along the line II—II of Figure 1.

Referring more particularly to the drawings, the numeral 1 designates a main process flow line such as a conduit for diethanolamine solution being fed to a contacting tower, not shown, for treatment of a material such as liquefied propane gas to remove hydrogen sulphide. A magnetic separator apparatus 2 is connected to the line 1 by means of inlet and outlet bypass conduits 3 and 4 respectively. Valves 3a and 4b are provided in the respective conduits. Connection of the line 3 to separator 2 is preferably made by way of a straight approach portion 3b provided with internal flow straightening vanes 5 arranged in spaced parallel relation, and extending into the separator for a short distance. The straightaway approach portion 3b of line 3, and vanes 5 are provided for the purpose of inducing substantially uniform straight-line flow through the separator with a minimum of turbulence. Preferably, this portion, between the upstream end of vanes 5 and the junction of portion 3b with line 3 should be at least one half the length of the vanes 5. Although shown in a horizontal position, the separator 2 may be disposed angularly with reference to the line 1, or may be arranged vertically and at right angles to the line of flow through line 1. Also, the material to be treated may be introduced into a vertical separator in such fashion as to induce a circular motion therein, as by means of a tangential inlet, provided turbulence within the separator is substantially avoided.

The separator 2 is disposed so as to lie substantially within a magnetic field. As shown, the field is induced through the separator 2 by means of a core 6 having field elements 6a and 6b and a coil 7 connected to a source of electrical energy as through leads 7a and 7b. Ordinarily, the force exerted by the magnetic field, on the particles contained in a material passed through the separator, may be substantially in the order of 12.5 dynes per hour.

Suitable means for controlling the flow through the main line and through the separator, and for maintaining suitable flow ratios therein are provided by means of a flow rate controller 8 in the main line ahead of bypass line 3, flow rate controller 9 in the bypass line 4, and differential pressure controller means 10 in the main line 1 between the flow rate controllers 8 in the main line 1 and flow rate controller 9 in the bypass line 4. Any suitable and conventional apparatus may be utilized for the controls, as desired. In an alternate arrangement, however, the flow rate controller 9 may be replaced or modified to provide ratio flow rate control. As shown, a connection 11 between the main line 1 and the flow rate controller 9 in line 4 may be provided. By this means, flow through the separator and bypass lines may be automatically proportioned to total flow through the line 1, and the separator 2, so as to maintain a ratio of flow through the separator of from about 0.02 to 0.5 of such total flow.

In passing through the magnetic field in the separator 2, the small particles of iron impurities in the material drawn from the line 1 are retained in the separator by magnetism induced by the electro-magnet. By continuously treating a proportional amount of the material passing through the line 1, iron impurities therein are prevented from accumulating, and from continuously building up deposits in the other parts of the system. It is, of course, possible to treat the entire volume of the materials being used, but, under ordinary circumstances, treatment of a comparatively small proportion will be found to be adequate. Also, while it is contemplated that the most advantageous results are to be obtained by subjecting only the treating solution to magnetic separation of the character described, under aggravated circumstances, the material being treated by the solution may also be subjected to magnetic separation of contained impurities. Likewise, while it is preferable to locate the separator in the line passing the treating solution to the contacting tower, such apparatus may also be utilized for separation of impurities from the treating solution from the tower on its way to regeneration equipment. Such preference is based on the fact that the operating temperature of the solution from the regeneration step after cooling is lower than that of the solution removed from the tower, and therefore the particles of iron impurities are more susceptible to magnetic separation, and also because the fresh feed or regenerated solution will contain a minimum of hydrogen sulphide, which in combination with the iron impurities, may tend to reduce the effectiveness of magnetic separation.

Means are also provided for flushing the separator of accumulated particles of iron impurities from time to time, as required. For this purpose, with the valves 3a and 4b closed, water may be introduced into the separator by way of a line 14, provided with valve 14a, into the line 4 and thence into the separator 2. The water thus introduced is purged from the separator by way of a line 16 opening from line 3, and a line 15 opening from the separator itself. Both lines 16 and 15 discharge through a common purge line 17 by way of valve 17a. With the upstream ends of vanes 5 spaced from the junction of line portion 3b with line 3 by at least one-half the length of the vanes 5, the vanes 5 also aid in directing flow of flushing water toward the outlet 16, thereby aiding to clear separated solid particles from the line portion 3b. During such flushing operation, the electro-magnet will be disconnected from its source of energy. If found necessary because of residual magnetism, particularly in the separator walls, the apparatus may be de-magnetized in conventional fashion as by applying to the electro-magnet a gradually diminishing alternating current. In most instances, however, sufficient turbulence of the stream of flushing water will be produced in the separator to overcome any residual magnetic effect. Where desired, two or more separators of the type described may be connected to the main flow line in parallel, so that during the flushing of one separator, another separator may be operatively connected in the system.

What is claimed is:

1. Apparatus for removing iron impurities from a flowing stream of fluid containing such impurities, comprising a main-line conduit for said fluid, an elongated separator vessel having an inlet and an outlet, an inlet bypass conduit communicating between said main-line conduit and the separator inlet, a straightaway flow approach portion in said bypass conduit opening from a junction with said bypass conduit at one end into the separator inlet at the other end, an outlet bypass conduit communicating between said separator outlet and the main-line conduit, flow-straightening means comprising a plurality of vaned elements internally of said separator inlet and approach portion extending into said separator in the direction of flow therethrough, magnetic means substantially co-extensive with said separator for inducing a magnetic field therein, whereby iron impurities in a stream of fluid passed through said separator are substantially retained within said field, separate conduit means connected to said outlet bypass conduit for introducing a reversely flowing fluid stream into said separator, and a second separate conduit means connected to said separator and the inlet bypass conduit for withdrawing said reversely flowing fluid from said separator whereby accumulated iron impurities may be removed from said separator.

2. An apparatus according to claim 1 in which said flow-straightening means consists of a plurality of vaned elements disposed laterally and horizontally of said approach portion and inlet in vertically spaced parallel relation one to another, and terminating at one end within the vessel beyond said inlet and at the other end within said approach portion at a distance from the junction of said portion with the inlet bypass conduit, which distance is not substantially less than one-half the length of said vanes.

HARLEY S. ANDERS.

REFERENCES CITED

The following references are of record in the file of this patent:

UNITED STATES PATENTS

| Number | Name | Date |
|---|---|---|
| 542,911 | Whitacre et al. | July 16, 1895 |
| 1,602,935 | Rasey | Oct. 12, 1926 |
| 1,673,837 | Lotz | June 19, 1928 |
| 1,773,275 | Neeley | Aug. 19, 1930 |
| 1,778,910 | Niven | Oct. 21, 1930 |
| 2,185,785 | Dorr et al. | Jan. 2, 1940 |
| 2,208,591 | Lyder | July 23, 1940 |
| 2,398,725 | Schutte | Apr. 16, 1946 |